(12) United States Patent
Kobayashi et al.

(10) Patent No.: US 6,691,191 B1
(45) Date of Patent: Feb. 10, 2004

(54) TRANSACTION RETRY IN MULTI-PROCESSOR SYSTEM

(75) Inventors: Kenichi Kobayashi, Kawasaki (JP); Toru Watabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 09/668,377

(22) Filed: Sep. 25, 2000

(30) Foreign Application Priority Data

Dec. 13, 1999 (JP) ............................................ 11-353728

(51) Int. Cl.[7] ............................ G06F 13/00; G06F 3/00
(52) U.S. Cl. ........................ 710/107; 710/32; 710/36; 710/59
(58) Field of Search ............................. 710/20, 21, 32, 710/36, 37, 59, 107

(56) References Cited

U.S. PATENT DOCUMENTS

| | | | | |
|---|---|---|---|---|
| 5,341,491 A | * | 8/1994 | Ramanujan | 711/152 |
| 5,546,546 A | * | 8/1996 | Bell et al. | 710/112 |
| 5,644,733 A | * | 7/1997 | Kalish et al. | 710/113 |
| 5,706,446 A | * | 1/1998 | Kalish et al. | 710/113 |
| 6,128,677 A | * | 10/2000 | Miller et al. | 710/40 |

* cited by examiner

*Primary Examiner*—Glenn A. Auve
*Assistant Examiner*—Trisha Vu
(74) *Attorney, Agent, or Firm*—Staas & Halsey LLP

(57) ABSTRACT

An information-processing device includes a bus, a plurality of processors connected to the bus, and a bus-control unit which detects whether an excessively retried address transaction is present. Each of the processors includes an issuing unit which issues address transactions, a monitoring unit which communicate with the bus-control unit, and a retry-control unit which controls the issuing unit to suspend or restrain issuance of address transactions, other than the excessively retried address transaction, and to put an already issued address transaction in a status of compulsory retry if the monitoring unit is informed of a presence of the excessively retried address transaction by the bus-control unit.

10 Claims, 19 Drawing Sheets

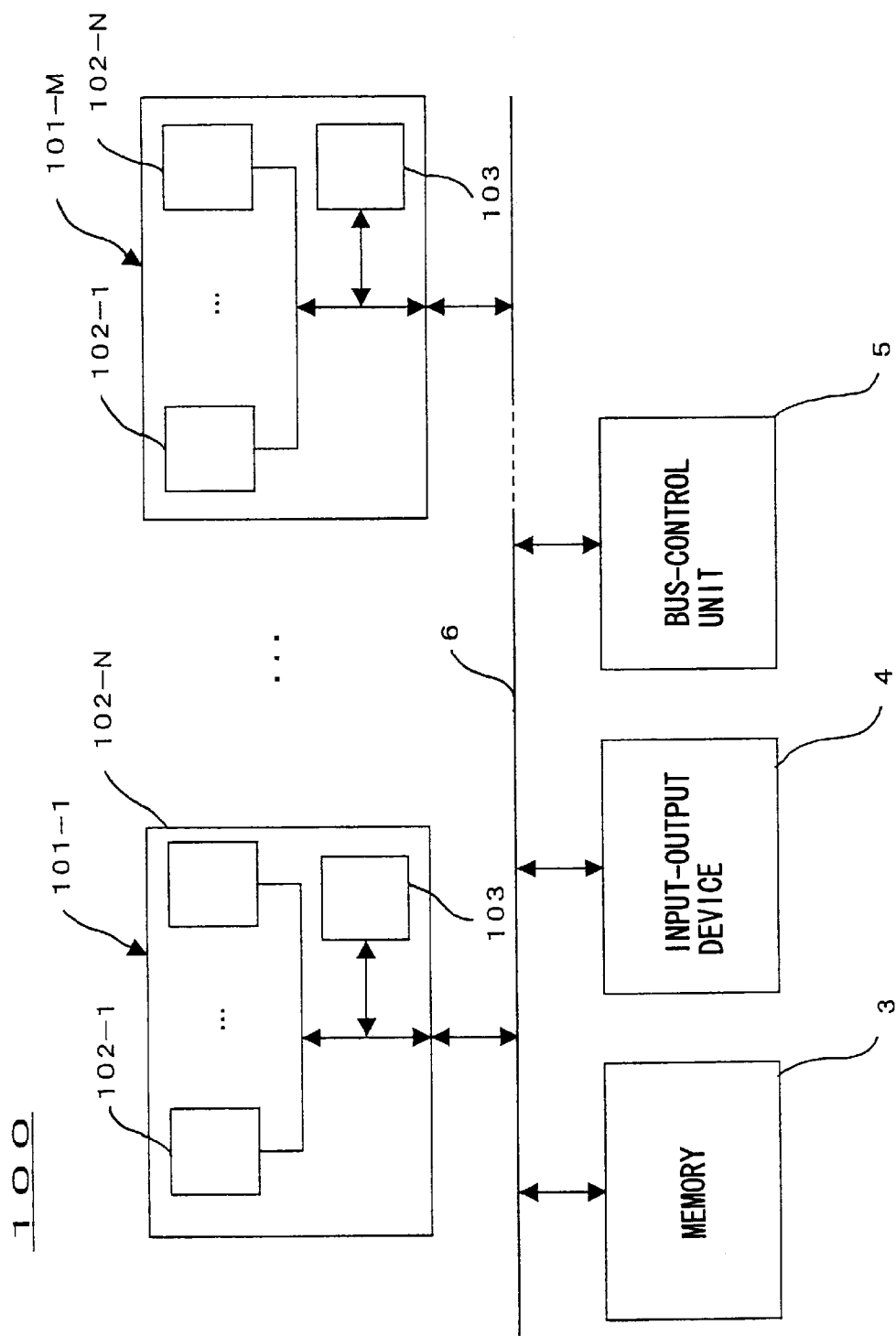

TRANSACTION RETRY IN MULTI-PROCESSOR SYSTEM

BACKGROUND OF THE INVENTION

1. Field of the Invention

The present invention generally relates to information-processing devices, information-processing methods, and processors, and particularly relates to an information-processing device, an information-processing method, and a processor which perform a transaction-retry operation.

2. Description of the Related Art

As large-scale servers are more widely used, there are expectations that multi-processor systems having a high data-processing capacity and a sufficient reliability will soon be available.

One of the most important factors that control performance of multi-processor systems is speed of a system bus. In order to increase speed of a system bus, the system bus may be pipelined.

A pipelined system bus can increase throughput of the bus. When error occurs, however, a flow of the pipeline operation is disturbed, resulting in a drop in performance. There are various schemes that are developed to avoid the performance drop at the time of error.

One of such schemes is a retry operation. The retry operation resumes a failed process by reissuing an address transaction that caused an error. Since the retry operation is a very important factor that controls performance of a multi-processor system, a reliable and high performance retry operation is necessary.

A pipelined system bus is configured such that an address transaction is divided into a plurality of stages, and that buses corresponding to the respective stages can process transactions independently of each other. Namely, pipelined transactions are performed.

Among various multi-processor systems, multi-processor systems of a shared memory type are regarded as that of a mainstream. The multi-processor systems of a shared memory type have a plurality of processors accessing a shared memory, so that address snooping is performed across the entire system, thereby maintaining coherency.

In such systems, two types of errors are observed. One is an error caused by a system failure or the like, and the other is an error that frequently occurs during a routine or normal operation because of address conflict or the like.

The address conflict occurs when two transactions accessing the same address are successively issued, and results of the first transaction are not available when the second transaction needs to refer them.

There are two methods to cope with this situation. The first method is to suspend the bus until the second transaction can be performed. The second method is to terminate the second transaction and to issue the same address to the bus.

The second method is called an address retry method, and a mechanism for performing an address retry operation is called an address-retry mechanism. Most of the related-art multi-processor systems are provided with an address-retry mechanism in order to prevent a decrease in system performance.

FIG. 1 is a block diagram of a related-art multi-processor system.

A multi-processor system 1 includes processors 2-1 through 2-N, a shared memory 3, an input-output device 4, a bus-control unit 5, and a system bus 6.

The processors 2-1 through 2-N perform operations according to instructions.

The memory 3 is connected to the N processors 2-1 through 2-N via the system bus 6, and is accessible from the N processors 2-1 through 2-N. The memory 3 is shared by the processors 2-1 through 2-N.

The input-output device 4 is comprised of a keyboard, a mouse, a display, a printer, a communication device, and the like. The input-output device 4 attends to data inputting/outputting, instruction inputting, processing result inputting/outputting.

The bus-control unit 5 is connected to the N processors 2-1 through 2-N and the input-output device 4, and controls the right to use the bus 6. The bus 6 is used for data transfer between the N processors 2-1 through 2-N, the memory 3, and the input-output device 4.

FIG. 2 is a block diagram showing a configuration of a processor shown in FIG. 1.

A processor 2-X is one of the N processors 2-1 through 2-N. The processor 2-X and the bus-control unit 5 are connected via the bus 6. The bus 6 includes an address bus 11, an address bus 12, a status bus 13, a status bus 14, and a data bus 15.

The address bus 11 transfers addresses from the processor 2-X to the bus-control unit 5. Addresses transferred through the address bus 11 are issued by the processor 2-X for transaction purposes, for example.

The address bus 12 transfers addresses from the bus-control unit 5 to the processor 2-X. Addresses transferred through the address bus 12 are arbitrated by the bus-control unit 5 so that permission to use the bus 6 is granted to these addresses, for example.

The status bus 13 delivers statuses of the processor 2-X from the processor 2-X to the bus-control unit 5. The statuses delivered by the status bus 13 include results of cache snooping performed by the processor 2-X.

The status bus 14 supplies statuses from the bus-control unit 5 to the processor 2-X. The statuses carried through the status bus 14 include combined results of cache snooping for the N processors 2-1 through 2-N. The data bus 15 transfers data according to the results of the cache snooping.

In the following, a related-art address-transaction process will be described.

The processor 2-X includes an arithmetic-logic unit 21, an address-control unit 22, and a snooping-control unit 23.

The arithmetic-logic unit 21 attends to data processing, and requests an address transaction according to the results of the data processing. The address-control unit 22 issues an address in response to the address-transaction request made by the arithmetic-logic unit 21.

The address-control unit 22 includes a queue-issuing unit 22a, a retry-control unit 22b, and a counter unit 22c. The queue-issuing unit 22a issues an address in accordance with the address transaction.

The retry-control unit 22b is connected to the arithmetic-logic unit 21, the snooping-control unit 23, and the bus-control unit 5. The retry-control unit 22b controls the queue-issuing unit 22a according to retry instruction sent from the snooping-control unit 23.

When this happens, the retry-control unit 22b has a retry count and/or a time limit recorded therein as they are sent from the arithmetic-logic unit 21. The counter unit 22c supplies a retry count and/or a time that are counted therein to the retry-control unit 22b. The retry-control unit 22b repeats a retry operation until the retry count or the time supplied from the counter unit 22c becomes the retry count or the time limit stored therein.

The retry-control unit 22b further stores therein a status of use of the bus 6 that is reported from the bus-control unit 5. The retry-control unit 22b controls frequency of retry operations according to the status reported by the bus-control unit 5.

The counter unit 22c counts a retry count, and/or marks time. The retry-control unit 22b refers to the retry count and/or the marked time supplied from the counter unit 22c, and limits the retry operations to a predetermined number or to be within the predetermined time period.

The snooping-control unit 23 obtains a cache status from the bus-control unit 5 in response to an address. The snooping-control unit 23 controls data transfer in response to the cache statuses of the entire system that are reported from the bus-control unit 5, and issues an instruction for an address retry.

In what follows, operation at the time of address transaction will be described.

At a first step, the arithmetic-logic unit 21 of the processor 2-X issues an address-transaction request. The address transaction request issued by the arithmetic-logic unit 21 is supplied to the queue-issuing unit 22a of the address-control unit 22.

At a second step, the queue-issuing unit 22a issues an address in response to the address transaction request from the arithmetic-logic unit 21. The address issued by the queue-issuing unit 22a is supplied to the bus-control unit 5.

At a third step, the bus-control unit 5 supplies the address sent from the processor 2-X to the address bus 12 of the processors 2-1 through 2-N.

At a fourth step, the processors 2-1 through 2-N obtain cache statuses with respect to the address indicated by the bus-control unit 5.

At a fifth step, the bus-control unit 5 combines the cache statuses reported from the processors 2-1 through 2-N, thereby obtaining the system-overall cache statuses.

At a sixth step, the bus-control unit 5 supplies the system-overall cache statuses to the processors 2-1 through 2-N. The processor 2-X receives the system-overall cache statuses from the bus-control unit 5.

At a seventh step, the processor 2-X controls data transfer based on the system-overall cache statuses reported from the bus-control unit 5.

The first through seventh steps are performed with respect to each transaction generated by the processors 2-1 through 2-N. The first through seventh steps are carried out in a pipeline manner to achieve multiple and simultaneous processes, thereby improving processing speed.

FIG. 3 is an illustrative drawing for explaining related-art pipeline processes.

In FIG. 3, transactions AT1 through AT3 are shown. The transaction AT1 is comprised of a second step S2 performed at a time t1, a third step S3 performed at a time t2, a fourth step S4 performed at a time t3, a fifth step S5 performed at a time t4, a sixth step S6 performed at a time t5, and a seventh step S7 performed at a time t6. The transaction AT2 is comprised of a second step S2 performed at the time t2, a third step S3 performed at the time t3, a fourth step S4 performed at the time t4, a fifth step S5 performed at the time t5, a sixth step S6 performed at the time t6, and a seventh step S7 performed at the time t7. The transaction AT3 is comprised of a second step S2 performed at the time t3, a third step S3 performed at the time t4, a fourth step S4 performed at the time t5, a fifth step S5 performed at the time t6, a sixth step S6 performed at the time t7, and a seventh step S7 performed at a time t8.

As shown here, the transactions AT1 through AT3 have identical steps thereof performed at respective and different timings. Since the bus is not exclusively occupied by a single transaction, efficient processing can be achieved. In order to take advantage of such pipeline operation, an address-retry mechanism is employed.

In the system as described above, however, when an address transaction continues to be subjected to retry operation many times, a processing time is elongated, resulting in a decrease in processing efficiency. Further, when a predetermined retry count or a predetermined time period is reached, a system is regarded as having a failure, resulting in a system shutdown.

Accordingly, there is a need for an information-processing device, an information-processing method, and a processor that perform retry operation in such a fashion as to make efficient use of a system and to achieve a sufficient reliability.

SUMMARY OF THE INVENTION

Accordingly, it is a general object of the present invention to provide an information-processing device, an information-processing method, and a processor that can obviate one or more of the shortcomings of the related art.

It is another and more specific object of the present invention to provide an information-processing device, an information-processing method, and a processor that can perform retry operation in such a fashion as to make efficient use of a system and to achieve a sufficient reliability.

In order to achieve the above objects according to the present invention, an information-processing device includes a bus, a plurality of processors connected to the bus, and a bus-control unit which detects whether an excessively retried address transaction is present. Any given one of the processors includes an issuing unit which issues address transactions, a monitoring unit which communicate with the bus-control unit, and a retry-control unit which controls the issuing unit to suspend issuance of address transactions other than the excessively retried address transaction and to put an already issued address transaction in a status of compulsory retry if the monitoring unit is informed of presence of the excessively retried address transaction by the bus-control unit.

The device described above makes it possible to process the excessively retried address transaction ahead of other address transactions, thereby ensuring that processing will be completed within a predetermined time period. This prevents the system from suffering shutdown.

According to another aspect of the present invention, the information-processing device as described above is such that the retry-control unit detects whether address transactions are of a special type, and allows the issuing unit to issue an address transaction of the special type even if the monitoring unit is informed of the presence of the excessively retried address transaction.

The device described above takes into account address transactions of a special type that do not have to be suppressed or must not be suppressed. Since the retry-control unit allows the issuing unit to issue an address transaction of the special type, the present invention does not interfere with the requirements that address transactions of the special type be not suppressed.

According to another aspect of the present invention, the information-processing device as described above is such that address transactions are classified into groups, and the retry-control unit controls the issuing unit to suspend issuance of new address transactions other than the excessively retried address transaction and to put an already issued address transaction in a status of compulsory retry only if the new address transactions and the already issued address transaction belong to a group that includes the excessively retried address transaction.

In the device described above, the address transactions are grouped, so that the status of excessive retry in a given group affects only the address transactions that belong to the same group. This insures that the status of excessive retry affects only the address transactions within a limited range.

Other objects and further features of the present invention will be apparent from the following detailed description when read in conjunction with the accompanying drawings.

BRIEF DESCRIPTION OF THE DRAWINGS

FIG. 19 is a block diagram of another example of a system to which the present invention is applied.

DESCRIPTION OF THE PREFERRED EMBODIMENTS

In the following, embodiments of the present invention will be described with reference to the accompanying drawings.

Figure 4:
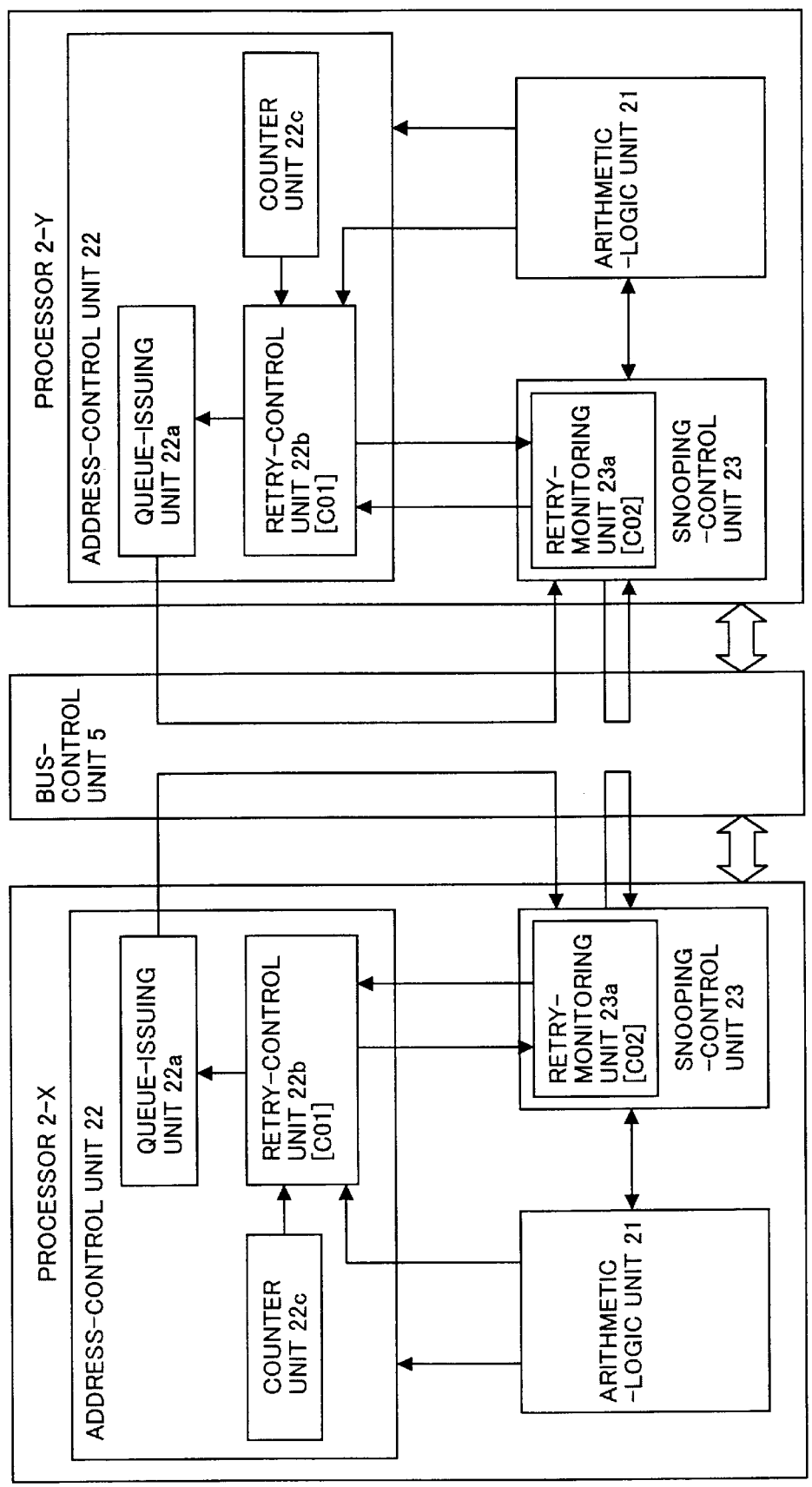
FIG. 4 is a block diagram of a system according to a first embodiment of the present invention.

FIG. 4 is a block diagram of a system according to a first embodiment of the present invention. In FIG. 4, the same elements as those of FIG. 2 are referred to by the same numerals, and a description thereof will be omitted.

Figure 2:
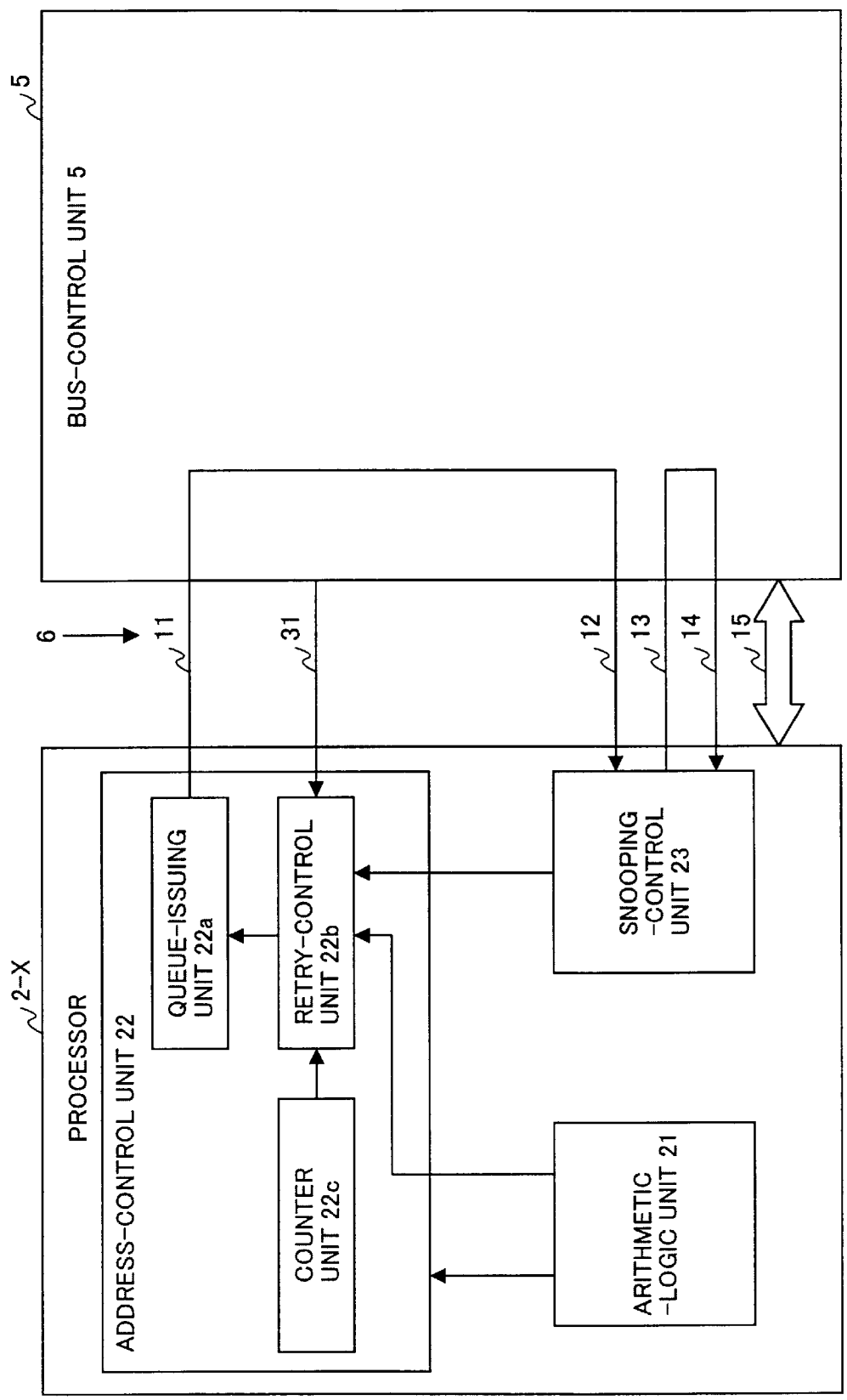
FIG. 2 is a block diagram showing a configuration of a processor shown in FIG. 1.
Figure 3:
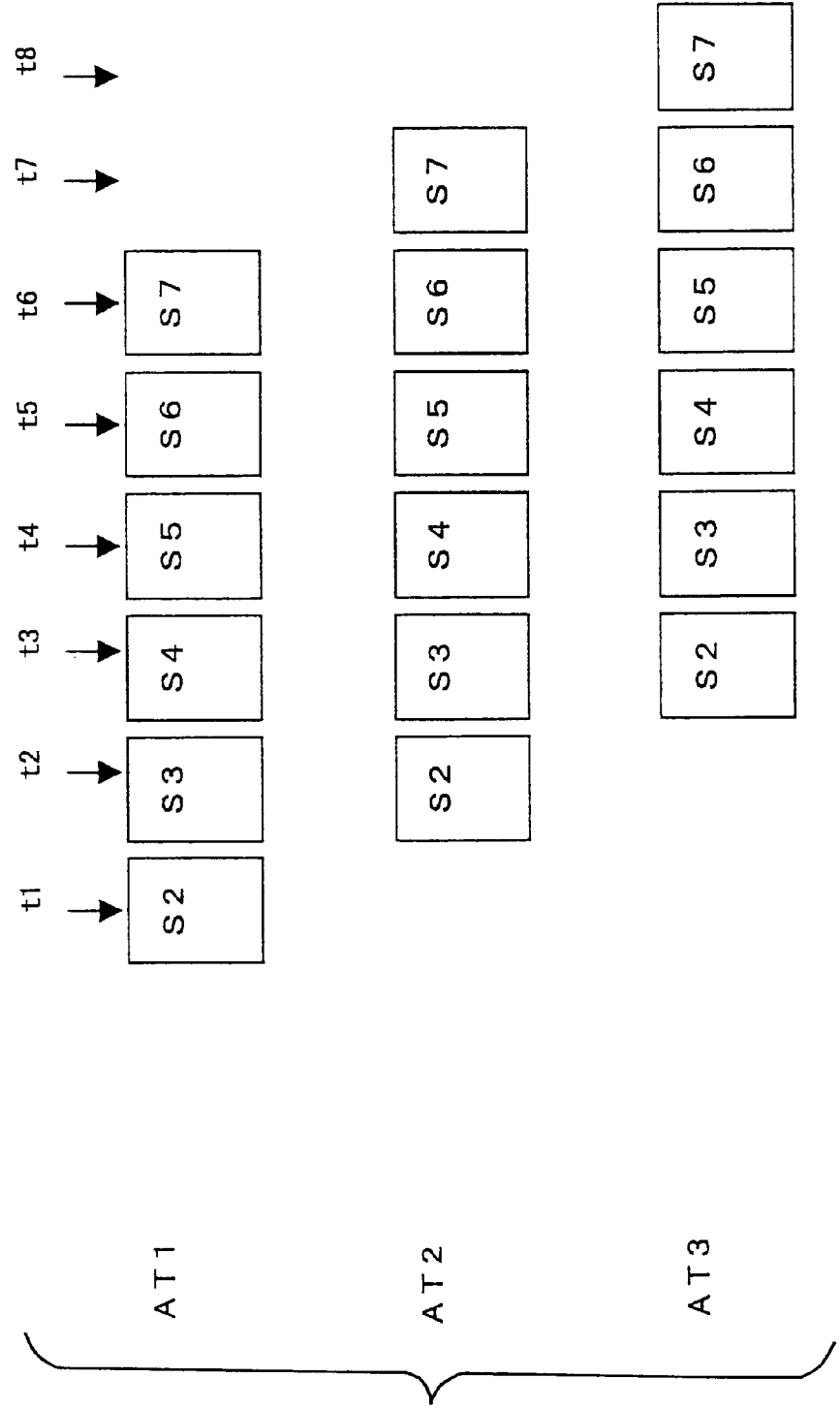
FIG. 3 is an illustrative drawing for explaining related-art pipeline processes.

In this embodiment, operation of the retry-control unit 22b differs from that of FIG. 2. Further, a retry-monitoring unit 23a is provided for the snooping-control unit 23.

Figure 5:
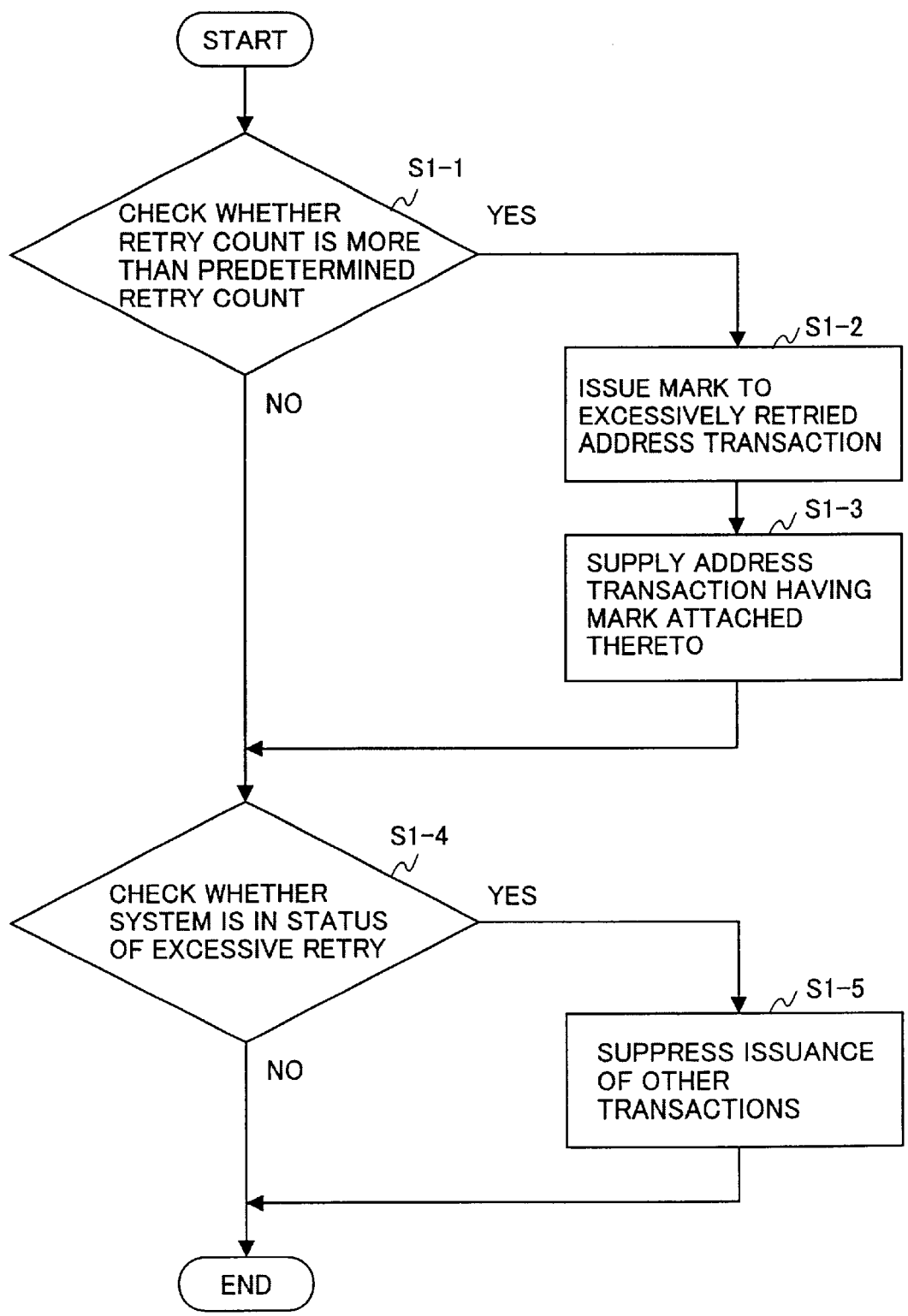
FIG. 5 is a flowchart of a process performed by a retry-control unit according to the first embodiment of the present invention.

FIG. 5 is a flowchart of a process performed by the retry-control unit according to the first embodiment of the present invention.

The retry-control unit 22b performs steps S1-1 through S1-5 described below.

At the step S1-1, a check is made as to whether a retry count reported from the counter unit 22c is more than the predetermined retry count. Here, the predetermined retry count is set by the arithmetic-logic unit 21 such that it is smaller than a count that would result in a system shutdown. Namely, even when the retry count reaches the predetermined retry count, the system does not suffer shutdown. The check made at the step S1-1 is carried out based on a combination of various conditions.

For example, a first condition may stipulate that a time period that has passed exceeds 80% of the time limit set by the arithmetic-logic unit 21. A second condition may stipulate that the retry count exceeds 40 when the number of processors is less than 32. A third condition may stipulate that the retry count exceeds 20 when the number of processors is more than or equal to 32. If the number of retry count is more than the predetermined retry count, the procedure goes to the step S1-2. Otherwise, the procedure goes to the step S1-4.

At the step S1-2, a mark is issued to an address transaction that has gone through an excessive number of retry operations.

Figure 6A:
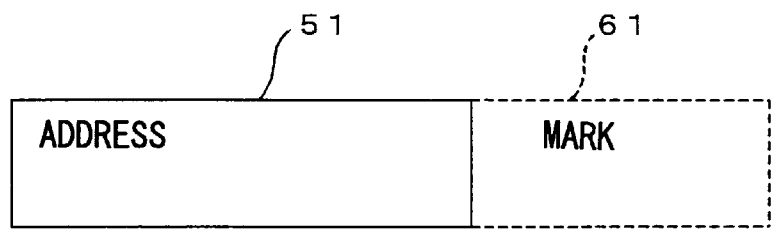
FIGS. 6A and 6B are illustrative drawings for explaining operation of the first embodiment of the present invention.
Figure 6B:
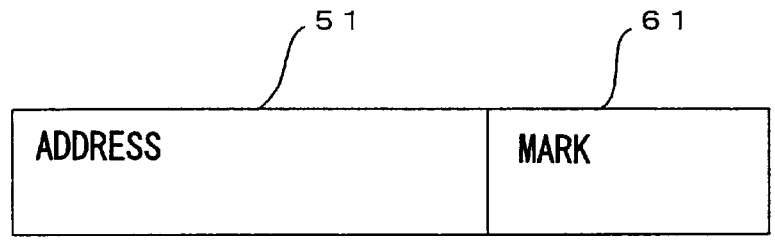

FIGS. 6A and 6B are illustrative drawings for explaining operation of the first embodiment of the present invention.

FIG. 6A shows a status of an address transaction that is issued during a routine or normal operation, and FIG. 6B exhibits a status of an address transaction that is issued when an excessive number of retry operations are performed.

As shown in FIG. 6A, the queue-issuing unit 22a supplies an address transaction 51 during a normal or routine operation. When an excessive number so retry operations is detected, however, the queue-issuing unit 22a issues a mark 61 attached to the address transaction 51 as shown in FIG. 6B in response to instruction from the retry-control unit 22b.

At the step S1-3, the address having the mark attached thereto is supplied to the bus-control unit 5.

At the step S1-4, a check is made as to whether the system is in a status of excessive retry. If the status of excessive system retry is not detected, the procedure comes to an end, and the retry operation will be repeated until the address retry is resolved.

If the step S1-4 finds that the system is in the status of excessive retry, the procedure goes to the step S1-5. At the step S1-5, the retry-control unit 22b is controlled such as to suppress issuance of other transactions that are not in a status of excessive retry.

Since issuance of transactions that are not in the status of excessive retry is suppressed, the step S1-5 insures that the transaction being in the status of excessive retry is given priority and processed ahead of other transactions. This serves to reduce occurrence of time expiration.

In the following, operation of the retry-monitoring unit 23a will be described.

Figure 7:
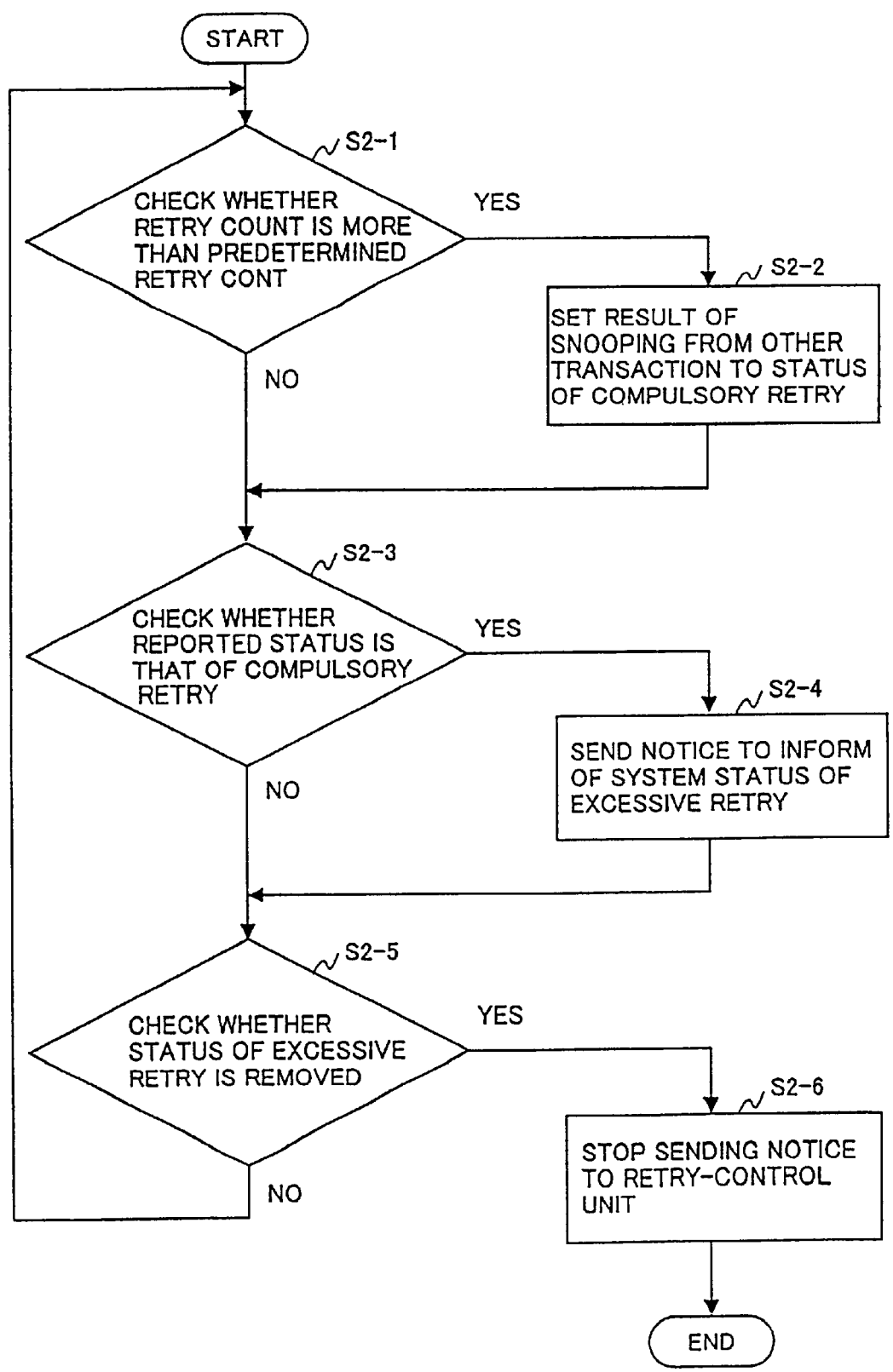
FIG. 7 is a flowchart of a process performed by a retry-monitoring unit according to the first embodiment of the present invention.

FIG. 7 is a flowchart of a process performed by the retry-monitoring unit according to the first embodiment of the present invention The retry-monitoring unit 23a carries out steps S2-1 through S2-6 described below.

At the step S2-1, a check is made as to whether the retry count is more than the predetermined retry count. If the retry count exceeds the predetermined retry count, the procedure goes to the step S2-2.

At the step S2-2, a result of snooping from other transactions that are not in a status of excessive retry is set to a status of compulsory retry.

At the step S2-3, a check is made as to whether the reported status is that of compulsory retry. If it is, the procedure goes to the step S2-4.

At the step S2-4, a notice is sent to the retry-control unit 22b to inform of the system status of excessive retry.

At the step S2-5, a check is made as to whether the status of excessive retry is removed. If the step S2-5 finds that the status of excessive retry is removed, the procedure goes to the step S2-6.

At the step S2-6, the notice that is sent to the retry-control unit 22b at the step S2-4 to inform of the status of excessive retry is nullified.

The retry-monitoring unit 23a places address transactions in the status of compulsory retry when these address transactions are not in the status of excessive retry. As a result, these address transactions end up being later retried. Because of this, the address transaction in the status of excessive retry is performed ahead of other transactions. This decreases a probability of the system experiencing an expiration of a time limit so as to suffer a shutdown.

In what follows, a method of checking the status of excessive retry at the step S2-1 will be described.

The check of an excessive retry status is made by a counter C01 provided in the retry-control unit 22b and a counter C02 provided in the retry-monitoring unit 23a. The counter C01 in the retry-control unit 22b counts address transactions that have gone through an excessive number of retry operations, and the counter C02 in the retry-monitoring unit 23a counts address transactions that have cache snooping thereof successively or erroneously completed during the excessive-retry status of the system.

Figure 8:
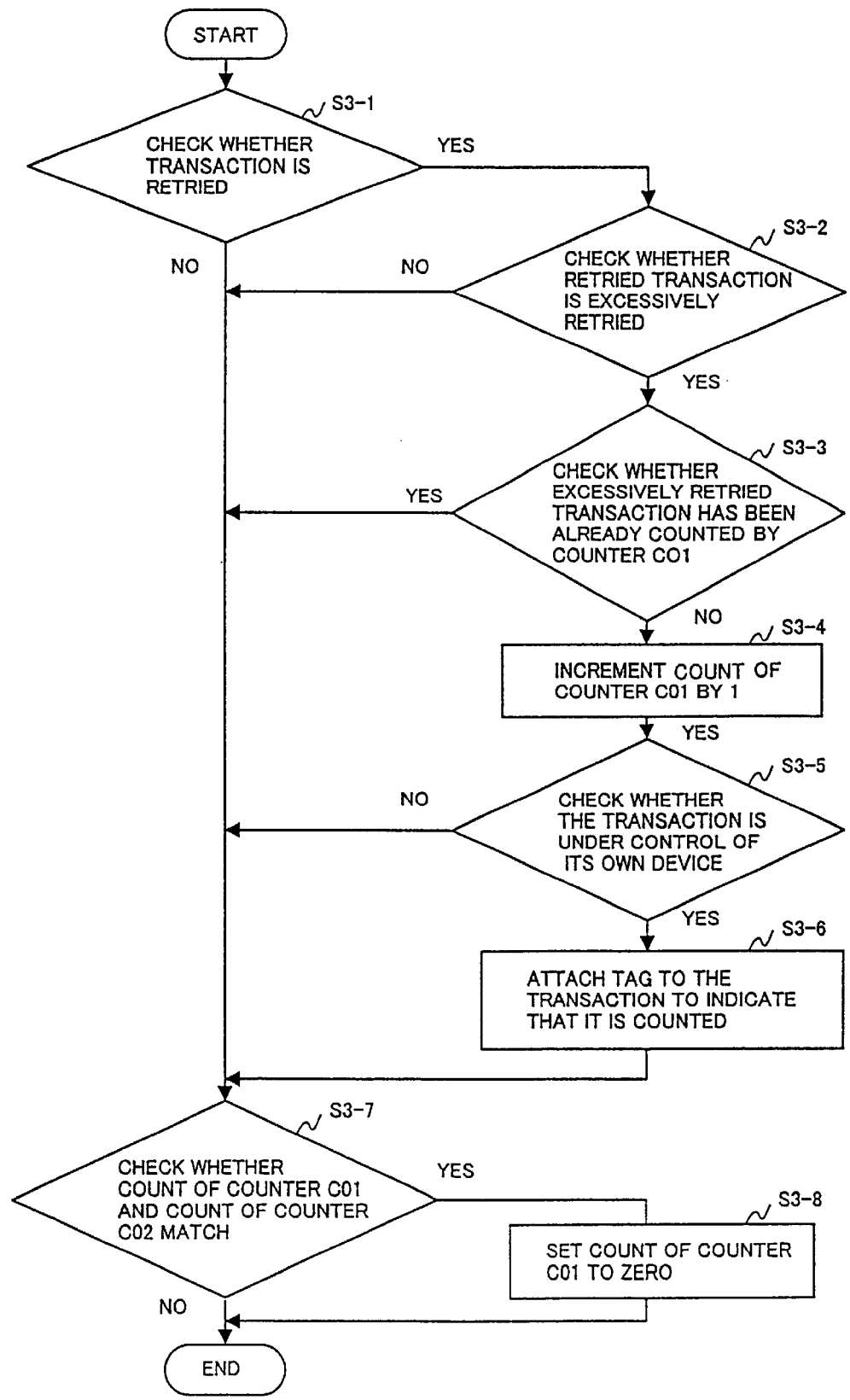
FIG. 8 is a flowchart of a process performed by the retry-control unit to check the status of excessive retry according to the first embodiment of the present invention.

FIG. 8 is a flowchart of a process performed by the retry-control unit to check the status of excessive retry according to the first embodiment of the present invention.

The retry-control unit 22b performs steps S3-1 through S3-8.

At the step S3-1, a check is made as to whether the transaction is retried. If the step S3-1 finds that the transaction is retried, the procedure goes to the step S3-2.

At the step S3-2, a check is made as to whether the retried transaction has gone through an excessive number of retry operations. If it has, the procedure goes to the step S3-3.

At the step S3-3, a check is made as to whether the excessively retried transaction has been already counted by the counter C01. If the step S3-3 finds that the excessively retried transaction is not yet counted by the counter C01, the procedure goes to the step S3-4.

At the step S3-4, the count of the counter C01 is incremented by 1.

At the step S3-5, a check is made as to whether the transaction is under the control of its own device. If it is, the procedure goes to the step S3-6.

At the step S3-6, a tag indicating that the transaction has been already counted is attached to the transaction.

At the step S3-7, a check is made as to whether the count of the counter C01 and the count of the counter C02 match. If these two counts match, it can be ascertained that the excessively retried transaction has been resolved, so that the procedure goes to the step S3-8.

At the step S3-8, the count of the counter C01 is set to zero.

Figure 9:
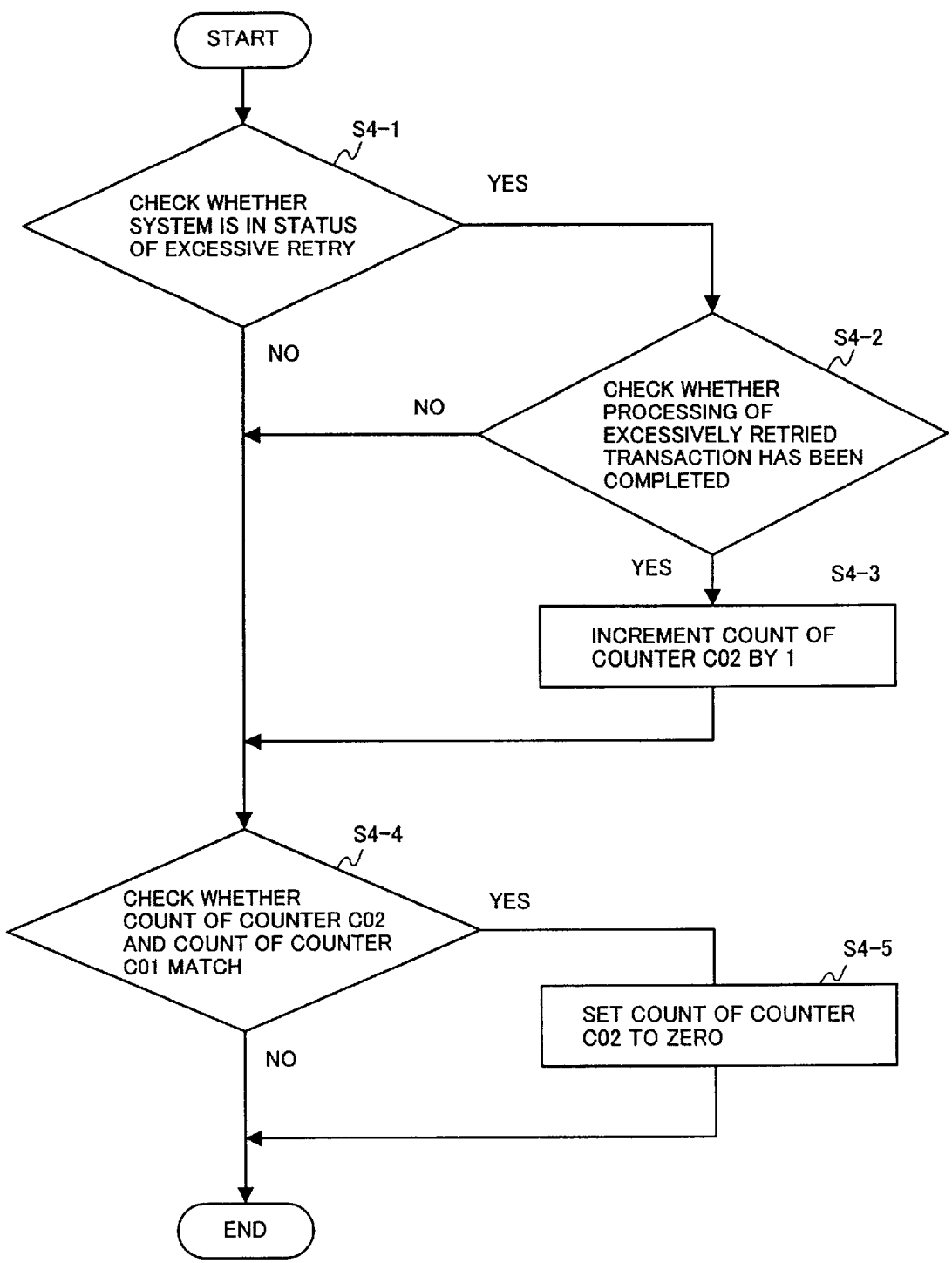
FIG. 9 is a flowchart of a process performed by the retry-monitoring unit to check the status of excessive retry according to the first embodiment of the present invention.

FIG. 9 is a flowchart of a process performed by the retry-monitoring unit to check the status of excessive retry according to the first embodiment of the present invention.

The retry-monitoring unit 23a carries out steps S4-1 through S4-5 described below.

At the step S4-1, a check is made as to whether the system is in the status of excessive retry. If it is, the procedure goes to the step S4-2.

At the step S4-2, a check is made as to whether processing of the excessively retried transaction has been completed. If it has been completed, the procedure goes to the step S4-3.

At the step S4-3, the count of the counter C02 is incremented by 1.

At the step S4-4, a check is made as to whether the count of the counter C02 and the count of the counter C01 match. If there is a match, the procedure goes to the step S4-5.

At the step S4-5, the count of the counter C02 is set to zero since it can be ascertained that there is no excessively retried transaction.

In this manner, the number of transactions that have gone through an excessive number of retry operations is counted, thereby making it possible to check the status of excessive retry.

In the method of checking the status of excessive retry described above, the number of excessively retried transactions is counted.

Alternatively, the status of excessive retry may be checked by providing a flag in the retry-monitoring unit 23a for an excessively retried transaction and by switching on/off the flag.

Figure 10:
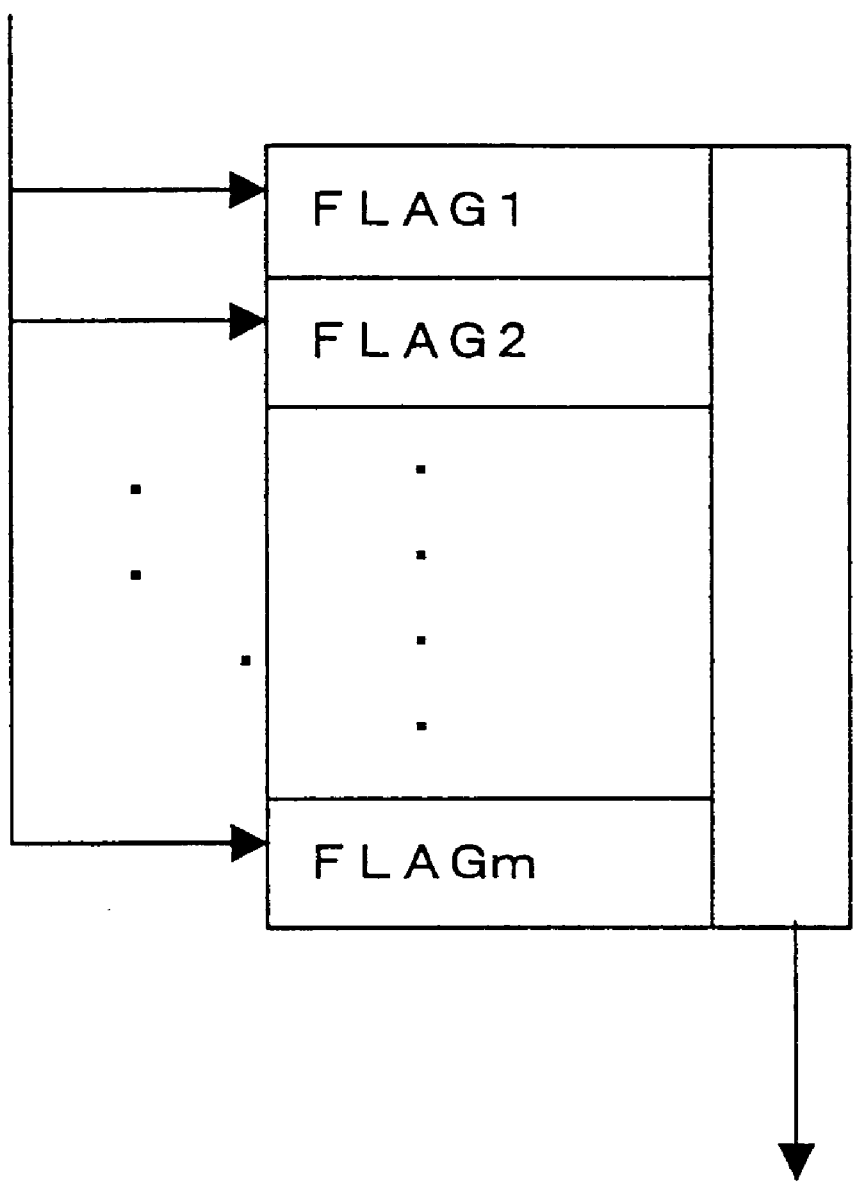
FIG. 10 is an illustrative drawing for explaining a method of checking the status of excessive retry according to the first embodiment of the present invention.

FIG. 10 is an illustrative drawing for explaining the method of checking the status of excessive retry according to the first embodiment of the present invention.

As shown in FIG. 10, the retry-monitoring unit 23a is provided with a plurality of flags FLAG1 through FLAGm. The number m of the flags is set to a maximum number of addresses that are excessively retried in the system.

When an excessively retried address is found, a corresponding flag is switched on. When the excessively retried address is resolved, the corresponding flag is switched off. When all the flags are switched off, the notice to the retry-control unit 22b that informs the excessively retried status is nullified.

Alternatively, a transaction for check purposes may be issued in order to check whether the system is in the status of excessive retry.

Figure 11:
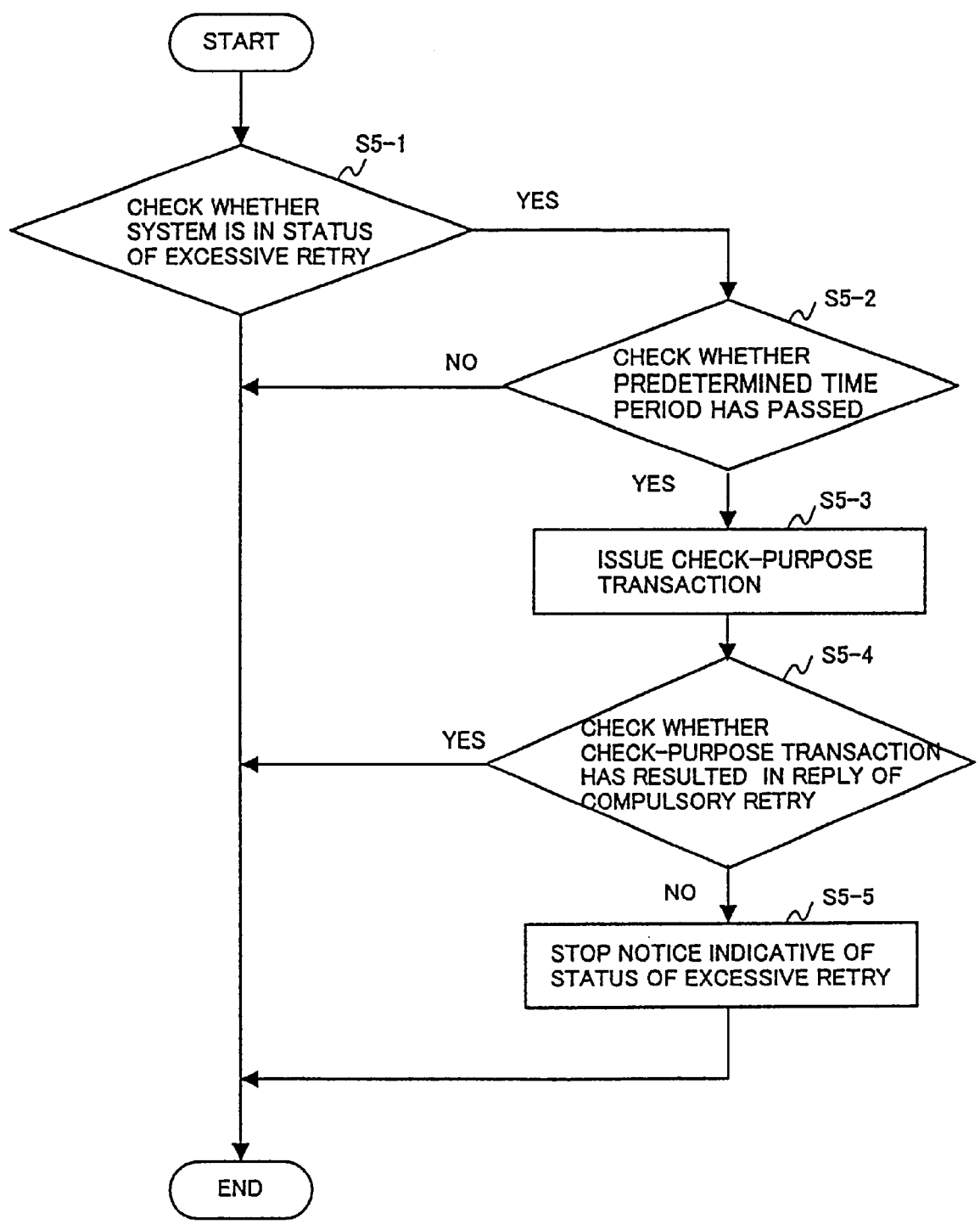
FIG. 11 is a flowchart of a variation of the process performed by the retry-control unit to check the status of excessive retry according to the first embodiment of the present invention.

FIG. 11 is a flowchart of a variation of the process performed by the retry-control unit to check the status of excessive retry according to the first embodiment of the present invention.

In this variation, the retry-control unit 22b performs steps S5-1 through S5-5 described below.

At the step S5-1, a check is made as to whether the system is in the status of excessive retry. If the step S5-1 finds that the system is in the status of excessive retry, the procedure goes to the step S5-2. If the step S5-1 finds that the system is not in the status of excessive retry, the procedure comes to an end.

At the step S5-2, a check is made as to whether the predetermined time period set in the retry-control unit 22b has passed. If it has, the procedure goes to the step S5-3.

At the step S5-3, a check-pupose transaction is issued by the queue-issuing unit 22a to the bus-control unit 5.

Figure 12:
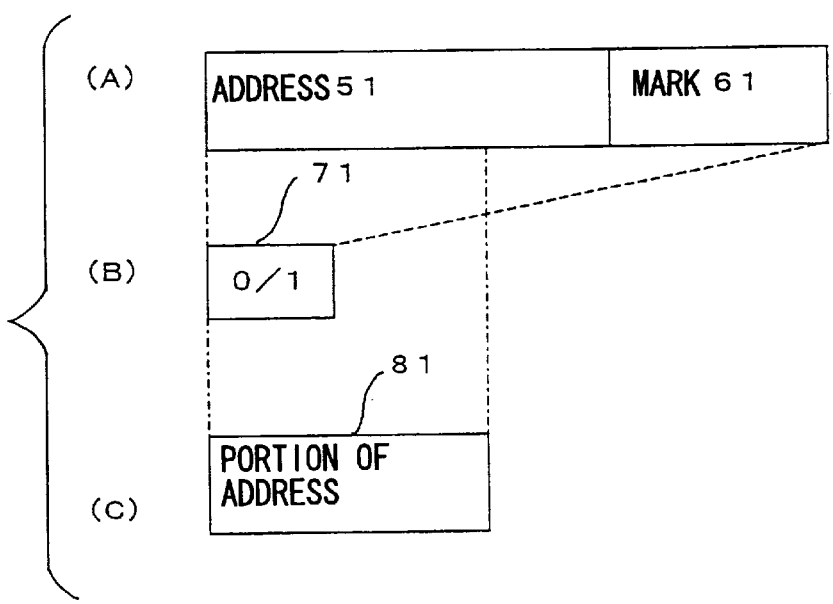
FIG. 12 is an illustrative drawing for explaining a check-purpose transaction used for checking the status of excessive retry according to the first embodiment of the present invention.

FIG. 12 is an illustrative drawing for explaining a check-purpose transaction used for checking the status of excessive retry according to the first embodiment of the present invention.

As shown in FIG. 12 as (b), a check-purpose transaction is comprised of a 1-bit transaction.

At the step S5-4, a check is made as to whether the check-purpose transaction has resulted in a reply of compulsory retry. If a reply of compulsory retry has not been received in response to the check-purpose transaction, it can be ascertained that the status of excessive retry has been resolved, so that the procedure goes to the step S5-5. At the step S5-5, the notice indicative of the status of excessive retry is stopped.

Use of the 1-ibt check-purpose transaction as described above does not congest the bus 6 unnecessarily.

The variation described above has been described with reference to an example in which a 1-bit check-purpose transaction is used. The present invention is not limited to use of this particular transaction, and an address transaction that is not in the status of excessive retry may be issued as a check-purpose transaction.

Alternatively, a portion 81 of the address 51 as shown in FIG. 12 as (c) may be used as a check-purpose transaction.

It should be noted that issuance of the check-purpose transaction is performed at such a frequency as not to congest the system bus 6.

The first embodiment has been described above with respect to routine or normal processing of address transactions. Address transactions, however, may include special types of transactions. Such special types of transactions are those which do not have to be suppressed or must not be suppressed.

In the following, a second embodiment of the present invention will be described.

The second embodiment has the same configuration as does the first embodiment, but operations of the retry-control unit 22b and the retry-monitoring unit 23a are different. A description of the configuration of the second embodiment will be omitted.

In what follows, operation of the retry-control unit 22b will be described according to the second embodiment of the present invention.

Figure 13:
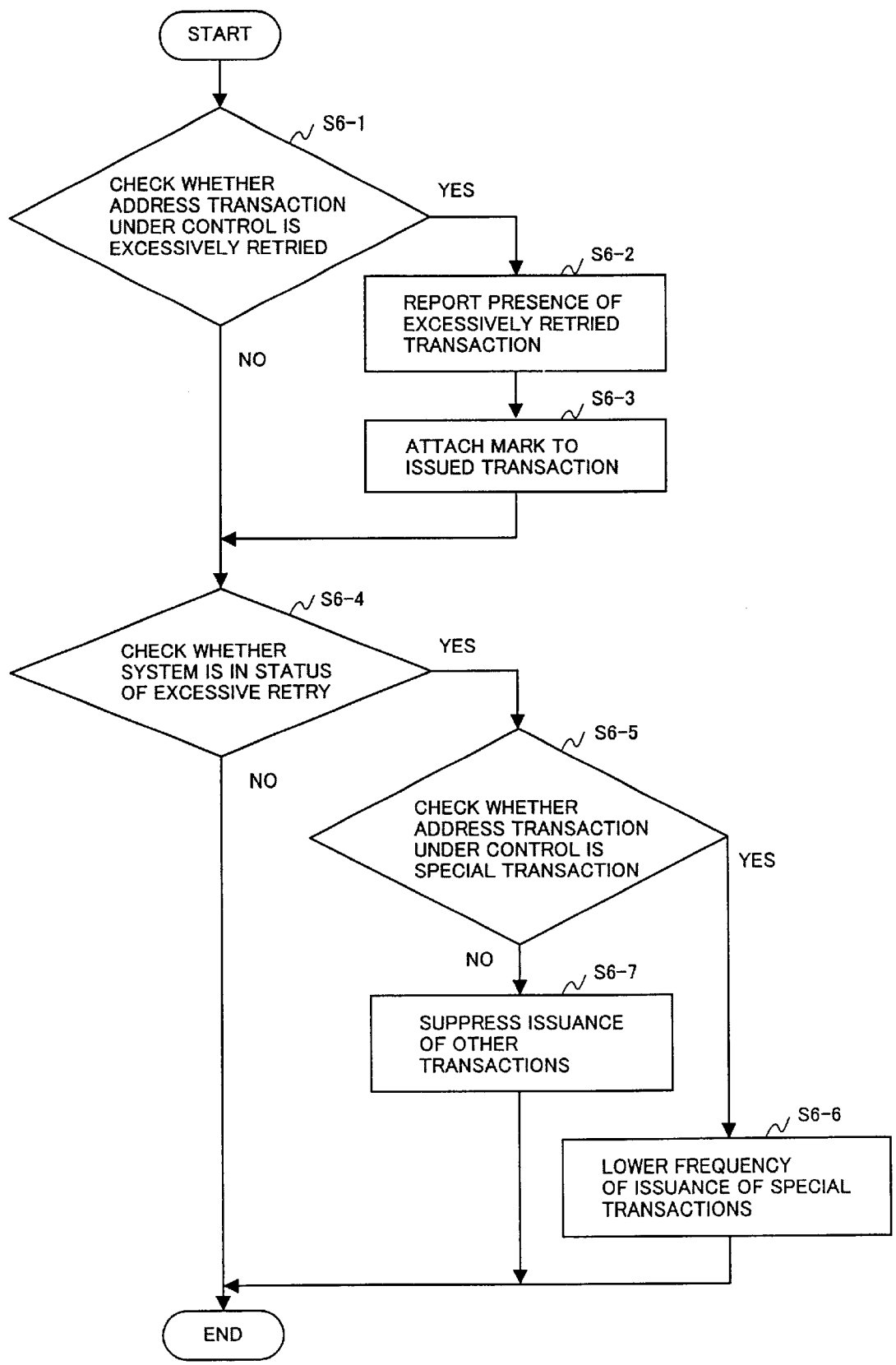
FIG. 13 is a flowchart of a process performed by the retry-control unit according to the second embodiment of the present invention.

FIG. 13 is a flowchart of a process performed by the retry-control unit according to the second embodiment of the present invention.

The retry-control unit 22b carries out steps S6-1 through S6-7.

At the step S6-1, a check is made as to whether an address transaction under the control of the retry-control unit 22b is excessively retried. If it is, the procedure goes to the step S6-2. If the step S6-1 finds that the address transaction under the control of the retry-control unit 22b is not excessively retried, the procedure goes to the step S6-4.

At the step S6-2, presence of the excessively retried transaction is reported to the retry-monitoring unit 23a. At the step S6-3, a mark is attached to the issued addresses to indicate the status of excessive retry as shown in FIG. 6B. Then, the procedure goes to the step S6-4.

At the step S6-4, a check is made as to whether the system is in the status of excessive retry. If the step S6-4 finds the system status of excessive retry, the procedure goes to the step S6-5.

At the step S6-5, a check is made as to whether the address transaction under the control is a special transaction. If it is, the procedure goes to the step S6-6. If the step S6-5 finds that the address transaction under the control is not a special transaction, the procedure goes to the step S6-7.

At the step S6-6, frequency of issuance of special transactions is lowered. At the step S6-7, issuance of other transactions that are not in a status of excessive retry is suppressed.

In the following, operation of the retry-monitoring unit 23a according to the second embodiment will be described.

Figure 14:
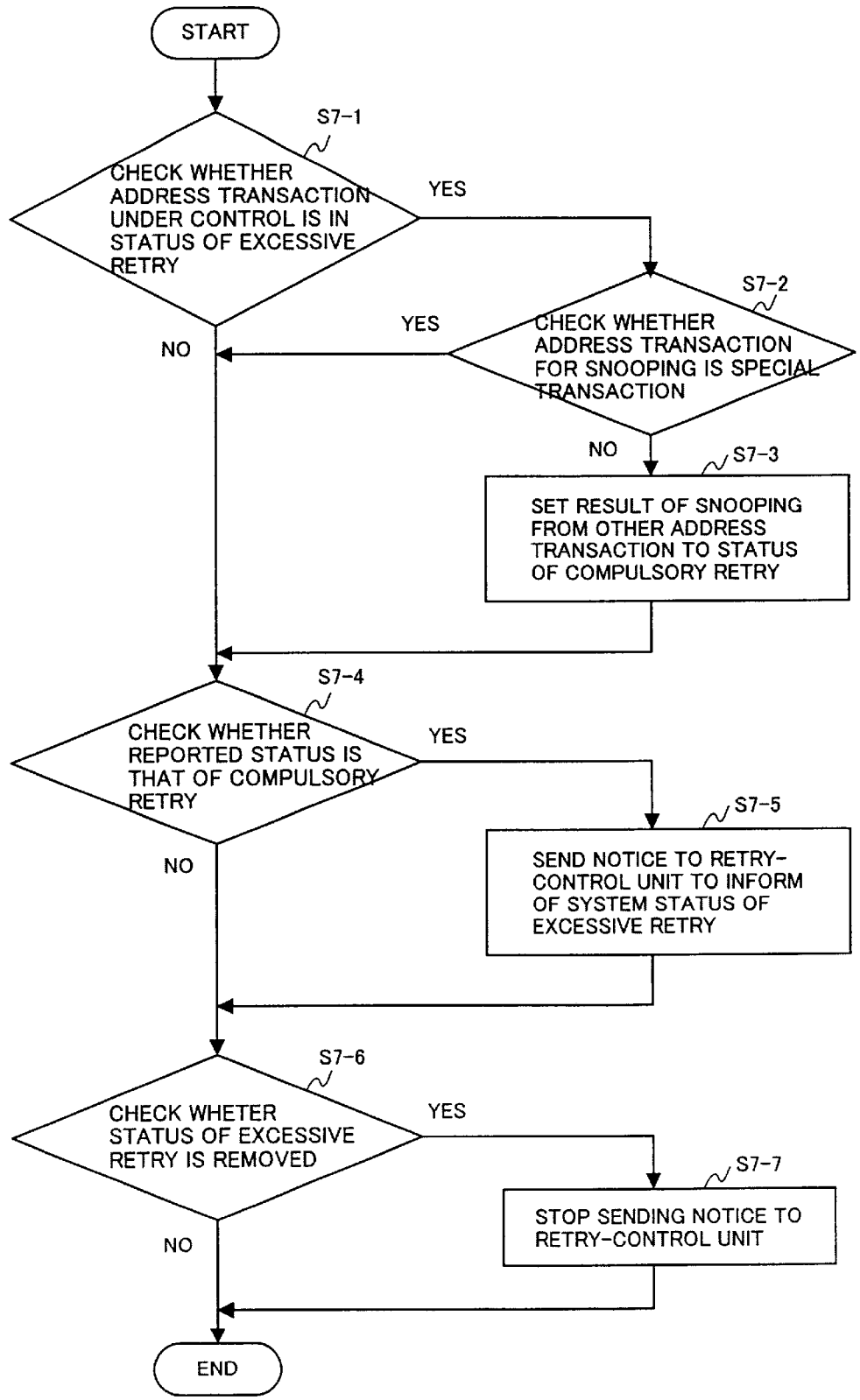
FIG. 14 is a flowchart of a process performed by the retry-monitoring unit according to the second embodiment of the present invention.

FIG. 14 is a flowchart of a process performed by the retry-monitoring unit according to the second embodiment of the present invention.

The retry-monitoring unit 23a carries out steps S7-1 through S7-7 described below.

At the step S7-1, a check is made as to whether an address transaction under the control of the retry-monitoring unit 23a is in the status of excessive retry. If it is, the procedure goes to the step S7-2. If the step S7-1 finds no excessive-retry status, the procedure goes to the step S7-4.

At the step S7-2, a check is made as to whether an address transaction for which the bus-control unit 5 is snooping is a special transaction. If it is, the procedure goes to the step S7-4. If the step S7-2 finds that the address transaction for which the bus-control unit 5 is snooping is an ordinary transaction, the procedure goes to the step S7-3 before proceeding to the step S7-4.

At the step S7-3, a result of snooping from other address transactions that are not in a status of excessive retry is set to a status of compulsory retry.

At the step S7-4, a check is made as to whether the reported status is that of compulsory retry.

If the step S7-4 finds the status of compulsory retry, the procedure goes to the step S7-5 before proceeding to the step S7-6. If the step S7-4 finds absence of the status of compulsory retry, the procedure goes to the step S7-6.

At the step S7-5, a notice is sent to the retry-control unit 22b to inform of the system status of excessive retry.

At the step S7-6, a check is made as to whether the status of excessive retry is removed. If the step S7-6 finds that the status of excessive retry is removed, the procedure goes to the step S7-7.

At the step S7-7, the notice that is sent to the retry-control unit 22b to inform of the status of excessive retry is stopped.

The retry-monitoring unit 23a repeats the above steps S7-1 through S7-7.

In this embodiment, address transactions in the status of excessive retry can be efficiently processed while taking into account presence of special address transactions.

In the following, a third embodiment of the present invention will be described.

The third embodiment is directed to grouping of address transactions for control purposes. The third embodiment has the same configuration as does the first embodiment, and operations of the retry-control unit 22b and the retry-monitoring unit 23a are different. A description of the configuration of the third embodiment will be omitted.

Figure 15A:
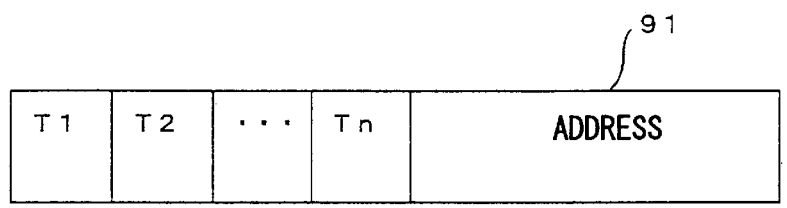
FIGS. 15A through 15C are illustrative drawings showing data structures of address transactions according to the third embodiment of the present invention.
Figure 15B:
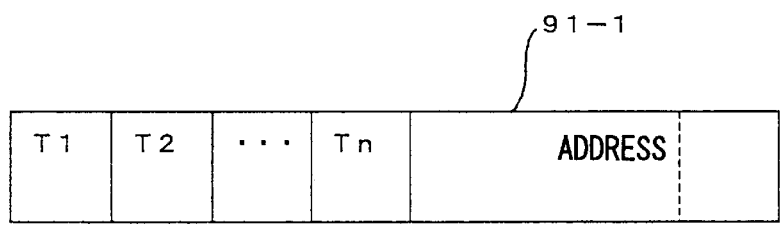
Figure 15C:
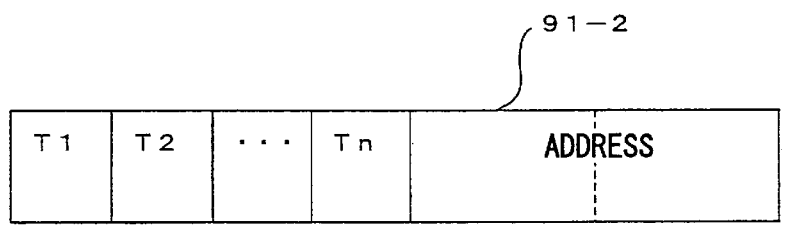

FIGS. 15A through 15C are illustrative drawings showing data structures of address transactions according to the third embodiment of the present invention.

As shown in FIG. 15A, an address transaction according to the present embodiment is comprised of transaction information items T1 through Tn and an address 91.

As shown in FIG. 15B, upper bits 91-1 of the address 91 are used to classify addresses into cache-line-based groups.

As shown in FIG. 15C, a transaction information item Tx and upper bits 91-2 of the address are used for grouping processors that include addresses. Here, the transaction information item Tx indicates any given one of the transaction information items T1 through Tn.

In what follows, operation of the retry-control unit 22b will be described.

Figure 16:
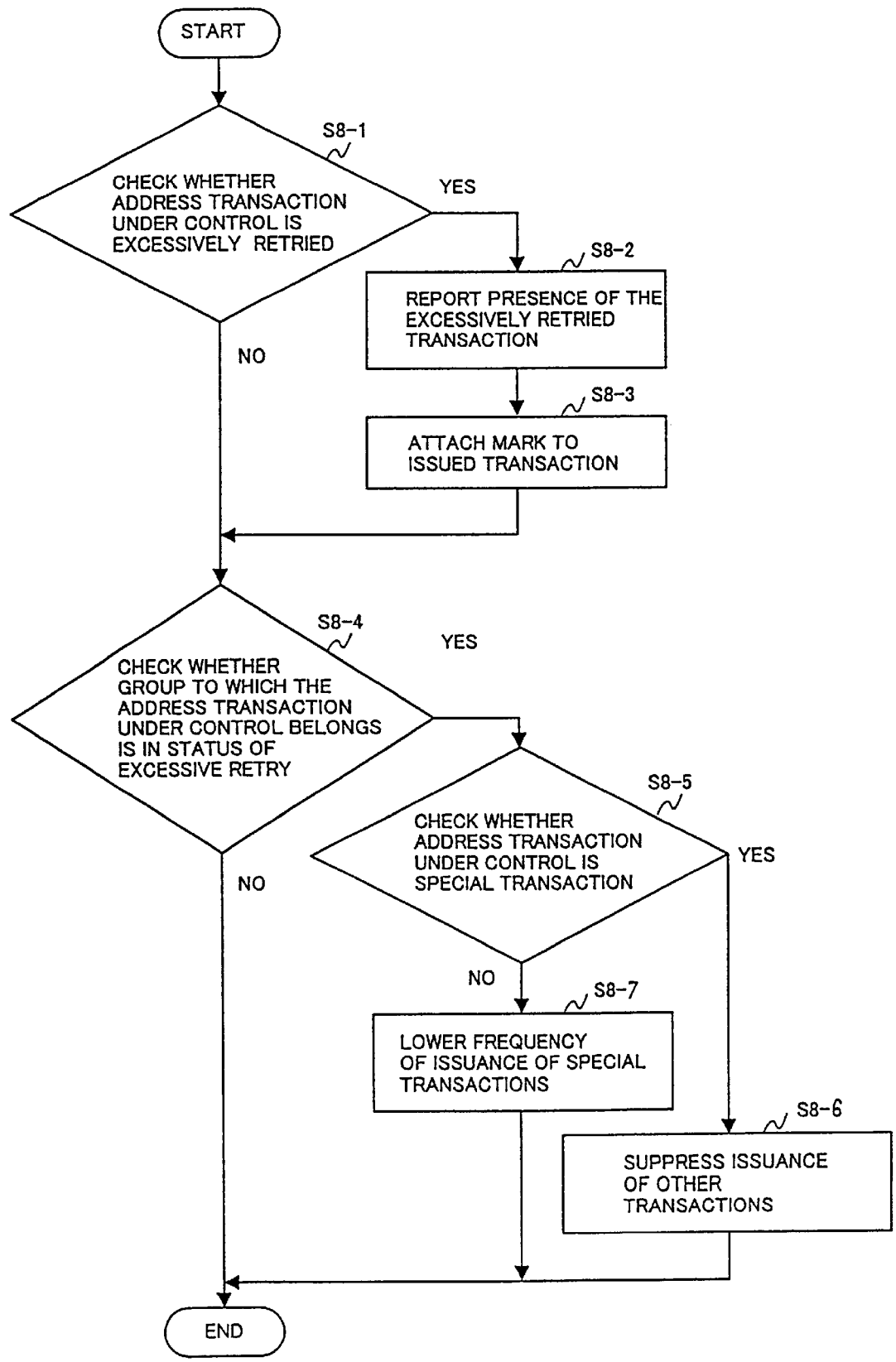
FIG. 16 is a flowchart of a process performed by the retry-control unit according to the third embodiment of the present invention.

FIG. 16 is a flowchart of a process performed by the retry-control unit according to the third embodiment of the present invention.

The retry-control unit 22b performs steps S8-1 through S8-7.

At the step S8-1, a check is made as to whether an address transaction under the control of the retry-control unit 22b is excessively retried. If it is, the procedure goes to the step S8-2, followed by the step S8-3, and then to the step S8-4. If the step S8-1 finds that the address transaction under the control of the retry-control unit 22b is not excessively retried, the procedure goes to the step S8-4.

At the step S8-2, presence of the excessively retried transaction is reported to the retry-monitoring unit 23a. At the step S8-3, a mark is attached to the issued addresses to indicate the status of excessive retry.

At the step S8-4, a check is made as to whether a group to which the address transaction under the control belongs is in the status of excessive retry. Here, the group that has the address transaction as a member thereof can be identified based on the upper bits 91-1 of the address 91 as shown in FIG. 15B or based on the transaction information item Tx and the upper bits 91-2 of the address 91 as shown in FIG. 15C.

If the step S8-4 finds that the group is in the status of excessive retry, the procedure goes to the step S8-5.

At the step S8-5, a check is made as to whether the address transaction under the control is a special transaction. If it is, the procedure goes to the step S8-6. If the step S8-5 finds that the address transaction under the control is not a special transaction, the procedure goes to the step S8-7.

At the step S8-6, frequency of issuance of special transactions is lowered. At the step S8-7, issuance of other transactions is suppressed.

In the following, operation of the retry-monitoring unit 23a according to the third embodiment will be described.

Figure 17:
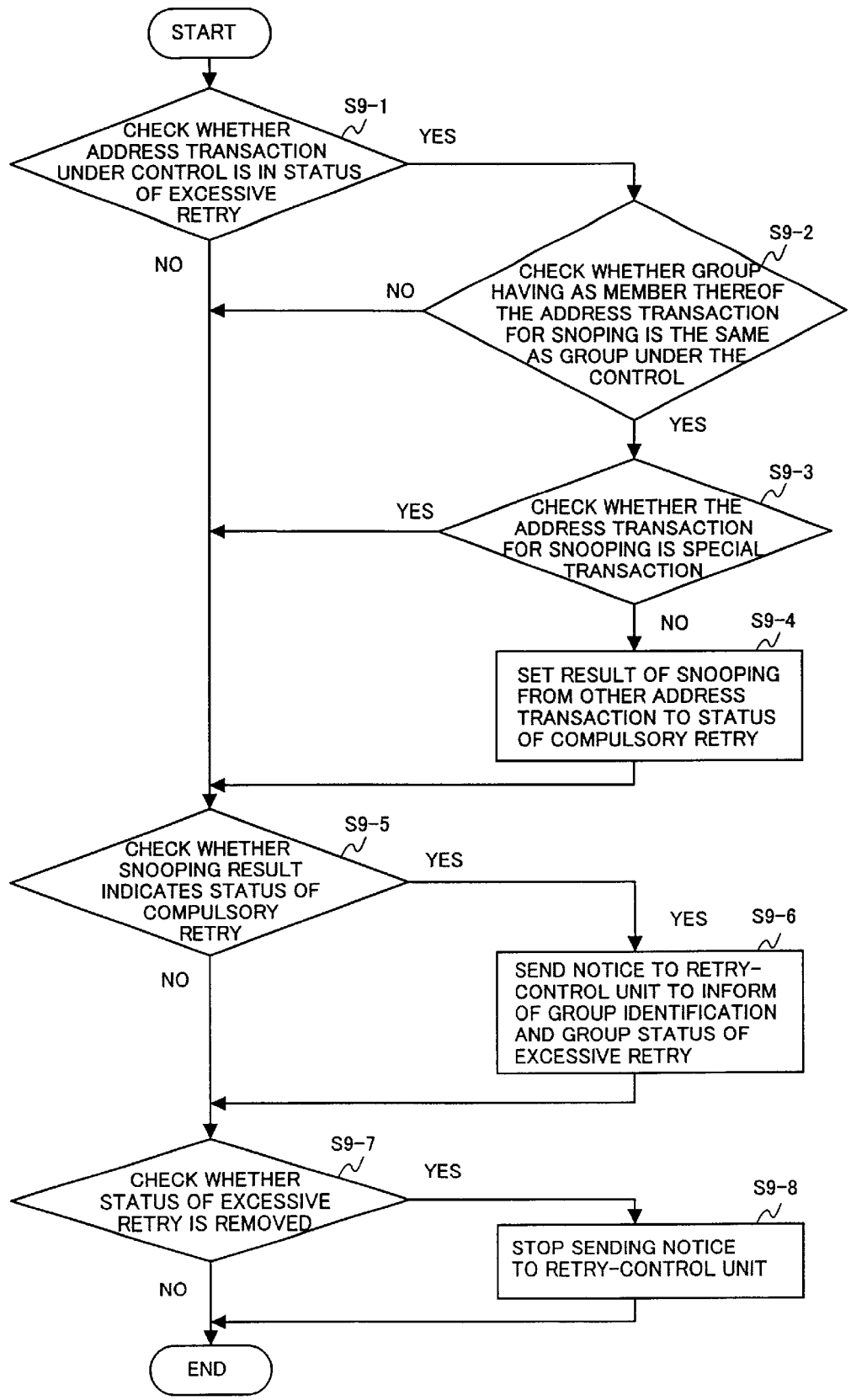
FIG. 17 is a flowchart of a process performed by the retry-monitoring unit according to the third embodiment of the present invention.

FIG. 17 is a flowchart of a process performed by the retry-monitoring unit according to the third embodiment of the present invention.

The retry-monitoring unit 23a carries out steps S9-1 through S9-8 described below.

At the step S9-1, a check is made as to whether an address transaction under the control of the retry-monitoring unit 23a is in the status of excessive retry. If it is, the procedure goes on to execute the steps S9-2 through S9-4 before proceeding to the step S9-5. If the step S9-1 finds no excessive-retry status, the procedure goes to the step S9-5.

At the step S9-2, a check is made as to whether a group having as a member thereof the address transaction for which the bus-control unit 5 is snooping is the same as a group under the control. If the step S9-2 finds that they are the same group, the procedure goes to the step S9-3. If the step S9-2 finds that they are not the same group, the procedure goes to the step S9-5.

At the step S9-3, a check is made as to whether the address transaction for which the bus-control unit 5 is snooping is a special transaction. If it is, the procedure goes to the step S9-5. If the step S9-3 finds that the address transaction for which the bus-control unit 5 is snooping is not a special transaction, the procedure goes to the step S9-4.

At the step S9-4, a result of snooping from other address transactions is set to a status of compulsory retry.

At the step S9-5, a check is made as to whether the snooping result indicates the status of compulsory retry.

If the step S9-5 finds that the snooping result does not indicate the status of compulsory retry, the procedure goes to the step S9-7. If the step S9-5 finds that the snooping result indicates the status of compulsory retry, the procedure goes to the step S9-6 before proceeding to the step S9-7.

At the step S9-6, a notice is sent to the retry-control unit 22b to inform of the group identification and the group status of excessive retry.

At the step S9-7, a check is made as to whether the status of excessive retry is removed. If the step S9-7 finds that the status of excessive retry is not yet resolved, the procedure comes to an end. If the step S9-7 finds that the status of excessive retry is resolved, the procedure goes to the step S9-8.

At the step S9-8, the notice that is sent to the retry-control unit 22b to inform of the group identification and the group status of excessive retry is stopped.

The retry-monitoring unit 23a carries out the steps S9-1 through S9-8 each time the bus-control unit 5 supplies an address transaction.

It should be noted that the grouping of address transactions is arranged such that the status of excessive retry does not interfere between the groups.

A method of classification into groups includes grouping of addresses on a cache-line-by-cache-line basis, grouping of addresses on a processor-by-processor basis, etc.

Further, group classification of address transactions may be altered such that the address transactions having gone through excessive retry are given priority.

Figure 18:
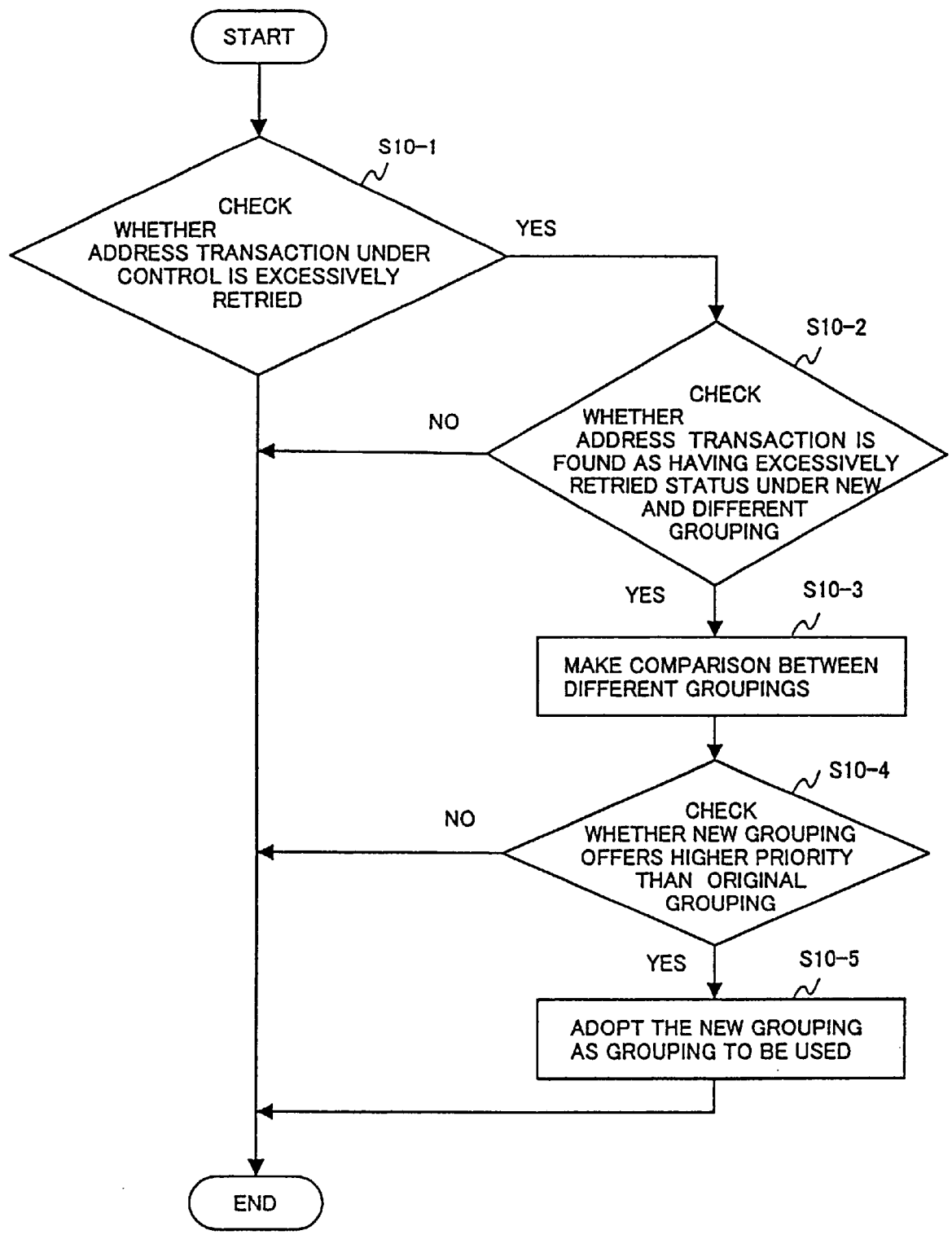
FIG. 18 is a flowchart of a variation of the process performed by the retry-control unit according to the third embodiment of the present invention.

FIG. 18 is a flowchart of a variation of the process performed by the retry-control unit according to the third embodiment of the present invention.

The process of altering the group classification includes steps S10-1 through S10-5.

At the step S10-1, a check is made as to whether an address transaction under the control of the retry-control unit 22b is excessively retried. If it is, the procedure goes to the step S10-2. If the step S10-1 finds no excessive retry status, the procedure comes to an end.

At the step S10-2, a check is made as to whether the address transaction is found as having an excessively retried status under a new and different grouping. If it is, the procedure goes to the step S10-3 before proceeding to the step S10-4. If the step S10-2 finds no excessive retry status under the new grouping, the procedure comes to an end.

At the step S10-3, a comparison is made between the different groupings.

At the step S10-4, a check is made as to whether the new grouping offers higher priority than the original grouping. If the step S10-4 finds that the new grouping offers higher priority than the original grouping, the procedure goes to the step S10-5. If the step S10-4 finds that the new grouping offers no higher priority than the original grouping, the procedure comes to an end.

At the step S10-5, the new grouping is adopted as a grouping to be used in subsequent control.

This embodiment switches group classifications so as to accord higher priority, so that a retry operation is performed ahead of other transactions, thereby helping to resolve the status of excessive retry.

The embodiments of the present invention have been described with reference to an example in which the N processors 2-1 through 2-N are connected to the system bus 6 to share the memory 3. Alternatively, a plurality of system boards each comprised of a plurality of processors and a memory may be connected to the system bus 6.

Figure 1:
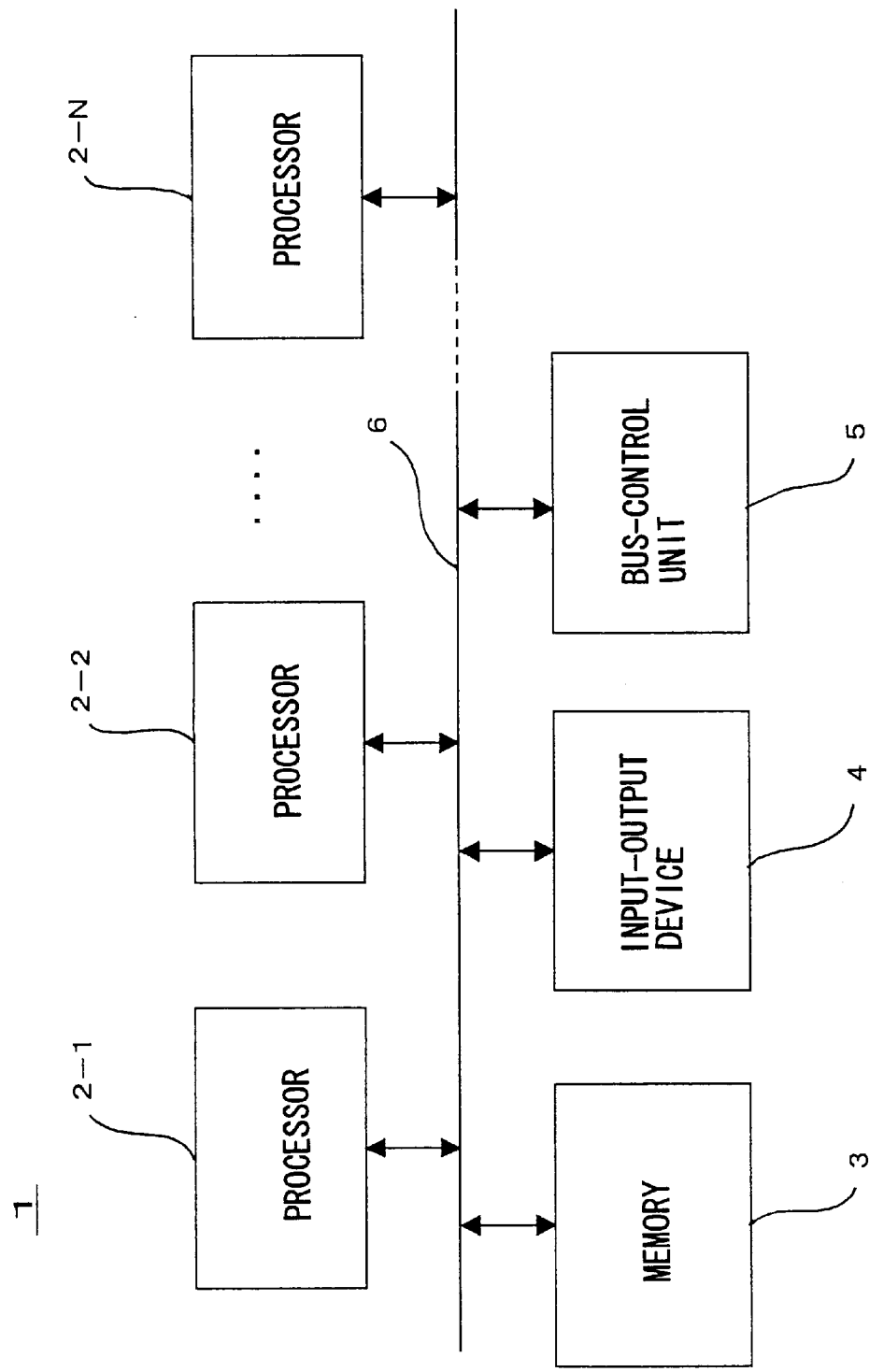
FIG. 1 is a block diagram of a related-art multi-processor system.

FIG. 19 is a block diagram of another example of a system to which the present invention is applied. In FIG. 19, the same elements as those of FIG. 1 are referred to by the same numerals, and a description thereof will be omitted.

The system of FIG. 19 includes M system boards 101-1 through 101-M. Each of the M system boards 101-1 through 101-M includes N processors 102-1 through 102-N and a memory 103. The system bus 6 is thus connected to the M×N processors. When address transactions generate error, each processor performs a retry operation as described above.

Further, the present invention is not limited to these embodiments, but various variations and modifications may be made without departing from the scope of the present invention.

The present application is based on Japanese priority application No. 11-353728 filed on Dec. 13, 1999, with the Japanese Patent Office, the entire contents of which are hereby incorporated by reference.

What is claimed is:

1. An information-processing device, comprising:

a bus;

a plurality of processors connected to said bus; and a bus-control unit which detects whether an excessively retried address transaction is present, wherein each of said processors includes:

an issuing unit which issues address transactions;

a monitoring unit which communicate with said bus-control unit; and a retry-control unit which controls said issuing unit to suspend issuance of address transactions other than the excessively retried address transaction and to put an already issued address transaction in a status of compulsory retry if said monitoring unit is informed of a presence of the excessively retried address transaction by said bus-control unit.

2. The information-processing device as claimed in claim 1, wherein said retry-control unit detects whether address transactions are of a special type, and allows said issuing unit to issue an address transaction of the special type even if said monitoring unit is informed of the presence of the excessively retried address transaction.

3. The information-processing device as claimed in claim 1, wherein the retry-control unit makes the issuing unit issue a check-purpose address transaction, and ascertains that the excessively retried address transaction is no longer in existence if a reply to the check-purpose address transaction does not indicate the presence of the excessively retried address transaction.

4. The information-processing device as claimed in claim 1, wherein address transactions are classified into groups, and said retry-control unit controls said issuing unit to suspend issuance of new address transactions other than the excessively retried address transaction and to put an already issued address transaction in a status of compulsory retry only if the new address transactions and the already issued address transaction belong to a group that includes the excessively retried address transaction.

5. The information-processing device as claimed in claim 4, wherein the group classification of the address transactions is successively changed to give increased priority to the excessively retried address transaction.

6. The information-processing device as claimed in claim 1, wherein said any given one of said processors includes one of a counter and a flag to record the excessively retried address transaction, said one of a counter and a flag being used to keep track of the excessively retried address transaction.

7. A method of controlling issuance of address transactions in each of a plurality of processors connected to a bus, comprising:

detecting by each of the plurality of processors whether an excessively retried address transaction is present; and suspending or restraining by each of the plurality of processors the issuance of address transactions other than the excessively retried address transaction and to put an already issued address transaction in a status of compulsory retry if a presence of the excessively retried address transaction is detected.

8. The method as claimed in claim 7, further comprising:

detecting whether address transactions are of a special type; and allowing the issuance of address transactions to issue an address transaction of the special type even if the presence of the excessively retried address transaction is detected.

9. The method as claimed in claim 7, further comprising:

issuing a check-purpose address transaction; and ascertaining that the excessively retried address transaction is no longer in existence if a reply to the check-purpose address transaction does not indicate the presence of the excessively retried address transaction.

10. A processor, to be connected to a bus to which other processors and a controller are connected, comprising:

an issuing unit which issues address transactions;

a monitoring unit which communicates with the controller; and a retry-control unit which controls said issuing unit to suspend or restrain issuance of address transactions, other than an excessively retried address transaction, and to put an already issued address transaction in a status of compulsory retry if said monitoring unit is informed of a presence of the excessively retried address transaction by the controller.

* * * * *

UNITED STATES PATENT AND TRADEMARK OFFICE
CERTIFICATE OF CORRECTION

PATENT NO.    : 6,691,191 B1
DATED         : February 10, 2004
INVENTOR(S)   : Kenichi Kobayashi et al.

It is certified that error appears in the above-identified patent and that said Letters Patent is hereby corrected as shown below:

Column 13,
Lines 54 and 56, change ";" to -- , --.

Signed and Sealed this

Fifteenth Day of June, 2004

JON W. DUDAS
*Acting Director of the United States Patent and Trademark Office*